3,235,339
DEVICE FOR FLOATING ZONE MELTING
Michel Brunet, Annie Brunet, and Emile Deyris, Caen, France, assignors to North American Philips Company, Inc., New York, N.Y., a corporation of Delaware
Filed Dec. 17, 1962, Ser. No. 245,287
Claims priority, application France, Dec. 22, 1961, 882,905
2 Claims. (Cl. 23—273)

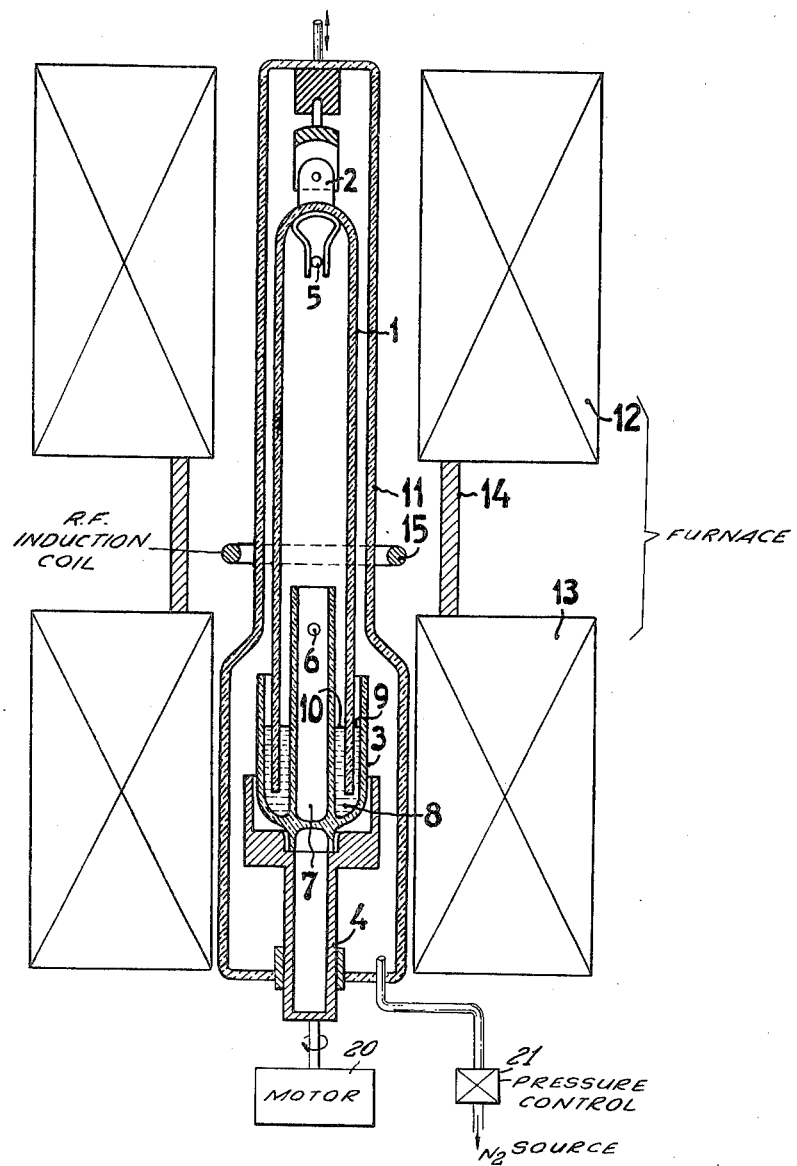

The invention relates to a device for floating zone melting comprising two coaxial holders arranged one above the other and serving to hold the ends of a bar to be treated, heating means for producing a molten zone in said bar, means for the vertical displacement of the heating means with respect to the bar holders, means for rotating one of the holders about its vertical axis relatively to the other holder, and a vessel surrounding the two holders in which a desired treating atmosphere may be provided.

Such devices are particularly employed for purifying, for doping with given impurities and/or for converting to the monocrystalline form fusible semi-conductor materials e.g. silicon, germanium and fusible compounds of the type $A^{III}B^V$.

It is important in this case that atmospheric impurities should not penetrate into the vessel. Moreover, in many cases it is required to provide an adjustable vapour pressure of a volatile substance in the vessel, for example the desired vapour pressure of a given impurity or of a compound of such an impurity for doping the semi-conductor material or the vapour pressure of a volatile constituent of a semi-conductor compound, for example a compound of the type $A^{III}B^V$, in the case of zone-melting such a compound. A conventional method consists in this case of introducing into the vessel a quantity of the volatile substance and in heating it to such a temperature that the required vapour pressure of the substance in the vessel is adjusted. The vessel should be hermetically closed as far as possible in order to avoid escaping of the vapour.

It is difficult in this case to control movable parts inside the vessel from the outside, for example for rotating at least one of the holders. Difficulties arise for example in taking a movable shaft through the wall of the vessel, since the use of the conventional lubricants may give rise to unwanted impurities in the atmosphere in the vessel and hence to the absorption of them in the semiconductor material.

It has been proposed in a device for producing crystals of gallium arsenide by pulling from a melt, in which the seed holder of the crystal must be drawn upwards in a vertical sense and must be rotated simultaneously, to employ a liquid trap on the upper side of the vessel, the liquid used therein being molten gallium. Gallium is a constituent of gallium arsenide, so that it does not give rise to contamination of the latter material. A vertical bar, to the lower end of which the seed holder is attached, is fastened to a bell-shaped part, the lower portion of which is introduced into the liquid provided in an annular container, the latter being connected with the wall of the vessel. The vessel is housed in a second vessel, in which the gas pressure can be regulated, so that the gas pressure on either side of the liquid trap can be maintained at least substantially at the same value. Since, during the drawing operation, the bell-shaped part is also drawn upwards and the liquid closure must be maintained during this operation, the length of the crystal drawn can never exceed the height of the liquid trap and the height of the liquid contained therein.

To enable the manufacture of crystals of a fairly great length, e.g. a few decimetres, a comparatively large quantity of molten gallium is required. However, gallium is a fairly rare and expensive metal, so that this device is too costly for application in the manufacture of single crystals on a technical scale.

It has furthermore been proposed in pulling crystals from a melt to draw up a seed holder in a completely closed vessel by means of magnetic forces. To this end the seed holder is fastened to a body of ferromagnetic material and a magnet arranged outside the vessel draws the body of ferromagnetic material between its pole shoes. By moving the magnet gradually upwards with respect to the vessel, the magnet thus will draw up the ferromagnetic body, which carries the seed holder and the crystal seed.

In this known device the seed holder with the ferromagnetic body is journalled inside the wall of the crucible, for example by using a graphite bearing around the ferromagnetic material. It has been found, however, that this device has disadvantages, since owing to friction with the wall graphite particles may be disengaged, which may contaminate the melt and even may form condensation nuclei during the drawing operation, so that polycrystalline material is obtained.

The present invention is based on the following considerations. Whereas in pulling crystals from a melt always two parts i.e. the seed holder and the crucible are to be moved preferably over a distance approximately equal to the desired length of the crystal in a vertical sense away from each other, such a movement may be dispensed with in floating zone melting or it may be reduced to a change in distance between the two holders arranged vertically one above the other, which change need only be very small and independent of the desired length of the bar to be produced by adapting the diameter of the bar-shaped body of the starting material to the desired diameter of the material treated or conversely, so that the length of the treated bar does not change substantially or varies only very little.

The invention has for its object inter alia to utilize this difference between the method of pulling a crystal from a melt and the floating zone melting method.

In accordance with the invention, a device for floating zone melting is characterized in that the vessel consists of two parts and a liquid trap arranged between said two parts. The holder for one end of a bar to be treated may be connected with one part and the holder for the other end may be connected with the other part. The liquid trap need have only a small height as compared with the distance between said holders, so that a comparatively small quantity of liquid may suffice for the trap. The height of the liquid trap and the quantity of liquid employed may still suffice to allow a small relative shift in a vertical sense, for example for regulating the shape of the molten zone. The liquid is preferably formed by molten gallium. Thus the device is particularly suitable for use with fusible compounds of the type $A^{III}B^V$, particularly gallium arsenide, gallium antimonide and gallium phosphide, but also for fusible $A^{III}B^V$ compounds in which the $A^{III}$ constituent is formed by indium or aluminum. Gallium has a very low melting point and a high boiling point. Owing to the comparatively small quantity of gallium required for the liquid trap, the high price of gallium is not an objection for technical application. As an alternative, molten indium may be used.

The liquid trap is preferably arranged beneath the fastening areas of the bar to be treated, so that if any splashing of liquid drops may occur the risk of drops falling on the material to be treated is reduced.

By regularly rotating one of the parts of the vessel relatively to the other, the fused zone is agitated so that a substantially fair homogeneity of temperature is obtained herein.

The assembly of the two parts of the vessel and of the liquid trap is moved vertically with respect to the stationary heating means. The distance of said movement of the assembly, which distance is limited by the dimensions of the vessel and not by the dimensions of the liquid trap, determines the length of the obtainable crystals. The liquid trap may be arranged at a level lower than that of the molten floating zone, so that any risk of contaminating the semi-conductor material by any drops being splashed from the liquid trap is eliminated. Moreover, the lower part of the vessel may be arranged so that it constitutes a container or containers for substances, the presence of which, particularly in the form of vapour, facilitates the operation or improves the quality of the obtained semi-conductor.

By surrounding the device with a hermetically closed chamber, containing an inert gas under a controllable and measurable pressure, and by simple observation across the transparent walls of the chamber and of the vessel, it can be ensured that the levels of the liquid of the trap are the same on the inner side and on the outer side of the vessel containing the semi-conductor, so that it is ensured that the vapour pressure on the inner side of the vessel is exactly equal to the pressure measured of the gas in the external chamber. If this pressure does not exhibit a suitable value, the adjustment of the heating means may be varied to adjust the lowest temperature in the vessel to such a value that the desired vapour pressure is obtained in the interior of the sealed vessel.

It should finally be noted that with the above device there will normally not be any risk of toxic constituents, for example arsenic being dislodged from the semi-conductor, neither in the chamber for adjusting the equilibrium of the pressure nor in the external atmosphere.

The invention will now be described more fully with reference to the accompanying drawing.

The device described hereinafter by way of example may serve for purifying and/or growing single crystals of gallium arsenide by the floating zone method.

The sole figure of the drawing is a sectional view of the device in its operational condition.

Reference numeral 1 designates the upper part of a vessel, suspended to a holding member 2; 3 denotes the lower part of the vessel, fixed to a support 4, which can be set rotating, as by the motor 20 shown schematically. A bar of gallium arsenide may be fixed at 5 to a holder attached to the upper part of the vessel and the other end of the bar (or a single crystal seed) may be fixed at 6 to a lower holder attached to the lower part of the vessel.

The lower part has at 7 a container in which arsenic may have been provided and at 8 a gallium container. The upper part of the vessel is dipped into the gallium container; the gallium is liquid at the temperature of said part of the vessel during the production of the gallium arsenide monocrystals. The level of the liquid gallium is indicated by 9 at the exterior of the vessel and by 10 on the inner side thereof; if the nitrogen pressure in the surrounding chamber 11 is equal to the vapour pressure inside the vessel, which is controlled by the valve 21 shown schematically, the levels 9 and 10 are equal. The chamber 11 constitutes one of the transparent walls of the hermetically sealed chamber surrounding the closed treating vessel 1, 3.

Heating means 12, 13 and 14, shown schematically as connected heater windings, surround the assembly of the device and can raise the temperature thereof. They serve, as is well known in the manufacture of these compound semiconductors, as a furnace to control the minimum temperature of the apparatus surfaces exposed to the volatile component of the compound to prevent loss thereof and decomposition of the compound. By means of a separate helix or induction coil 15 coupled to a radio-frequency generator (not shown) and thus traversed by high-frequency current, the temperature of the bar may be brought locally to the value desired for the molten zone. The assembly of the vessel and of the protecting chamber may be vertically displaced inside the stationary heating means.

It will be obvious that a device according to the invention may be used for zone-melting semi-conductor materials other than gallium arsenide and that the material or the technical components in the assembly given by way of example may be replaced by other ones within the scope of the present invention.

What is claimed is:

1. Floating zone melting apparatus for treating semi-conductive materials, comprising upper and lower, spaced, aligned holders adapted to hold and support opposite ends of a bar of the material to be treated, a vessel connected to the holders and enclosing the holders and the bar, said vessel comprising a lower, upwardly-facing cup-shaped portion for holding a liquid therein and fixedly connected to the lower holder and an upper, downwardly-facing cup-shaped portion whose lowermost end portion extends within the lower cup-shaped portion and fixedly connected to the upper holder, said upper and lower vessel portions being symmetrical about a common vertical axis, a sealing liquid in the lower cup-shaped portion at a level at which the lowermost end-portion of the upper cup-shaped portion is immersed in the liquid, said liquid acting to seal off the interior of the vessel while allowing relative movement between the upper and lower vessel portions, means for rotating the upper and lower vessel portions relative to one another about the common vertical axis, heating means arranged outside of the vessel for establishing a molten zone in the bar, means for the relative vertical displacement between the heating means and the vessel for causing the molten zone to traverse the bar, a chamber enclosing the vessel, and means for controlling the gas pressure within the chamber.

2. Floating zone melting apparatus for treating semi-conductive materials, comprising upper and lower, spaced, aligned holders adapted to hold and support opposite ends of a bar of the material to be treated, a vessel connected to the holders and enclosing the holders and the bar, said vessel comprising a lower, upwardly-facing cup-shaped portion for holding a sealing molten metal liquid therein and fixedly connected to the lower holder and an upper, downwardly-facing cup-shaped portion whose lowermost end portion extends within the lower cup-shaped portion and fixedly connected to the upper holder, a sealing liquid metallic melt in the lower cupshaped portion at a level at which the lowermost end-portion of the upper cup-shaped portion is immersed in the liquid, said melt level extending below the lower holder for the semiconductive bar, said liquid being selected from the group consisting of gallium and indium and acting to seal off the interior of the vessel while allowing relative rotational movement between the upper and lower vessel portions, high-frequency heating means arranged outside of the vessel for establishing a molten zone in the bar, and means for the relative vertical displacement between the heating means and the vessel for causing the molten zone to traverse the bar, the height of the liquid level in the lower cup-shaped portion being smaller than the spacing between the holders.

References Cited by the Examiner

UNITED STATES PATENTS

| | | | |
|---|---|---|---|
| 2,357,694 | 9/1944 | Schutte | 214—17.4 |
| 2,972,525 | 2/1961 | Emeis | 23—301 |
| 3,154,384 | 10/1964 | Jones | 23—273 |

OTHER REFERENCES

Richards, Journal of Scientific Instruments, vol. 34, July 1957, pages 289 and 290, Q 184 J7.

Cunnell et al., Solid-State Electronics, Pergamon Press.

NORMAN YUDKOFF, *Primary Examiner.*